(12) United States Patent
Filev et al.

(10) Patent No.: US 8,965,597 B2
(45) Date of Patent: Feb. 24, 2015

(54) ROAD GRADE AUTO-MAPPING

(71) Applicant: Ford Global Technologies, LLC, Dearborn, MI (US)

(72) Inventors: Dimitar P. Filev, Novi, MI (US); John O. Michelini, Sterling Heights, MI (US); Steven J. Szwabowski, Northville, MI (US); Diana Yanakiev, Birmingham, MI (US); Mahmoud Abou-Nasr, I, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 181 days.

(21) Appl. No.: 13/777,100

(22) Filed: Feb. 26, 2013

(65) Prior Publication Data

US 2014/0244067 A1 Aug. 28, 2014

(51) Int. Cl.
*G06F 19/00* (2011.01)
*F02D 13/06* (2006.01)
(Continued)

(52) U.S. Cl.
CPC ............... *G06F 17/00* (2013.01); *G06F 17/16* (2013.01); *B60W 10/00* (2013.01); *B60W 2550/142* (2013.01)
USPC ............... 701/1; 701/409; 701/101; 701/102; 701/532; 701/93; 73/146; 180/170; 340/438; 340/995.18; 340/995.24

(58) Field of Classification Search
USPC ........... 701/409, 1, 101, 102, 532, 65, 80, 93; 73/146; 180/170; 340/438, 995.18, 340/995.24
See application file for complete search history.

(56) References Cited

U.S. PATENT DOCUMENTS 5,933,100 A   8/1999   Golding
6,321,162 B1  11/2001  Hessing
(Continued)

FOREIGN PATENT DOCUMENTS

GB          2480877 A       7/2011

OTHER PUBLICATIONS

McDonough, et al., "Modeling of vehicle driving conditions using transition probability models" Control Applications (CCA), 2011 IEEE International Conference, pp. 544-549, Sep. 28-30, 2011.*

(Continued)

*Primary Examiner* — Adam Tissot
(74) *Attorney, Agent, or Firm* — Frank MacKenzie; MacMillan, Sobanski & Todd, LLC

(57) ABSTRACT

Road grade is modeled over a region in which a vehicle is driven on roadways having a grade that varies over a plurality of predetermined grade ranges. A succession of grade values are generated while operating the vehicle at a predetermined rate, wherein each grade value identifies a respective grade range then being encountered. A Markov chain road-grade model is updated in response to the succession of grade values, wherein the model represents respective elements of probability in a matrix of transition events from each predetermined grade range to a respective next-in-succession grade range. Each element of the matrix has a value $\pi_{i,j}$ representing a weighted frequency of transition events from a first respective grade value to a second respective grade value divided by a weighted frequency of transition events initiating from the first respective grade value, so that the matrix successively approximates the road grade of the region.

18 Claims, 3 Drawing Sheets

(51) Int. Cl.
  *G06F 17/00* (2006.01)
  *G06F 17/16* (2006.01)
  *B60W 10/00* (2006.01)

(56) References Cited

U.S. PATENT DOCUMENTS

| | | | |
|---|---|---|---|
| 6,374,173 B1 * | 4/2002 | Ehlbeck | 701/93 |
| 6,480,783 B1 | 11/2002 | Myr | |
| 6,990,401 B2 | 1/2006 | Neiss et al. | |
| 7,289,039 B2 | 10/2007 | Kato et al. | |
| 7,383,154 B2 | 6/2008 | Tate, Jr. | |
| 7,440,843 B2 | 10/2008 | Yoshikawa et al. | |
| 7,774,123 B2 | 8/2010 | Schröder | |
| 7,859,392 B2 | 12/2010 | McClellan et al. | |
| 7,899,610 B2 | 3/2011 | McClellan | |
| 8,060,606 B2 | 11/2011 | Friedman et al. | |
| 8,265,850 B2 | 9/2012 | Shin | |
| 2007/0265759 A1 | 11/2007 | Salinas et al. | |
| 2008/0114521 A1 | 5/2008 | Doering | |
| 2009/0271084 A1 | 10/2009 | Taguchi | |
| 2009/0276135 A1 | 11/2009 | Hagemann et al. | |
| 2010/0204896 A1 | 8/2010 | Biondo et al. | |
| 2012/0176234 A1 | 7/2012 | Taneyhill et al. | |
| 2012/0197504 A1 | 8/2012 | Sujan et al. | |
| 2012/0239282 A1 | 9/2012 | Taguchi | |

OTHER PUBLICATIONS

Lin, et al., "A stochastic control strategy for hybrid electric vehicles," American Control Conference, 2004. Proceedings of the 2004, vol. 5, no., pp. 4710-4715 vol. 5, Jun. 30, 2004-Jul. 2, 2004.

Kolmanovsky, et al., "Stochastic optimal control of systems with soft constraints and opportunities for automotive applicants," Control Applications, (CCA) & Intelligent Control, (ISIC), 2009 IEEE, vol., no., pp. 1265-1270, Jul. 8-10, 2009.

Kolmanovsky, et al., Terrain and Traffic Optimized Vehicle Speed Control, 2010, pp. 378-383.

Filev, et al., "A generalized Markov Chain modeling approach for on board applications," Neural Networks (IJCNN), The 2010 International Joint Conference on , vol., no., pp. 1-8, Jul. 18-23, 2010.

McDonough, et al., "Modeling of vehicle driving conditions using transition probability models," Control Applications (CCA), 2011 IEEE International Conference on, vol., no., pp. 544-549, Sep. 28-30, 2011.

Desjardins, et al., Cooperative Adaptive Cruise Control: A Reinforcement Learning Approach, IEEE Transactions on Intelligent Transporation Systems, vol. 12, No. 4, Dec. 2011, pp. 1248-1260.

McDonogh, et al., "Stochastic dynamic programming control policies for fuel efficient in-traffic driving," American Control Conference (ACC), 2012, vol., no., pp. 3986-3991, Jun. 27-29, 2012.

* cited by examiner

ROAD GRADE AUTO-MAPPING

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to vehicle control systems, and, more specifically, to the creation and use of an on-board model of road grade or other road characteristic for use in optimizing vehicle powertrain performance.

Vehicle manufacturers continually strive to minimize energy consumption for driving a vehicle (e.g., maximizing the distance driven per unit of gas for a gasoline vehicle or unit of electrical charge for an electrically-driven vehicle). Important influences on efficiency include the speed at which the vehicle is driven, road grade variations over the driven route, and traffic conditions. Automatic speed control (i.e., cruise control) systems can have a beneficial impact on fuel economy by reducing the amount of time spent accelerating the vehicle, especially during highway driving. Maintaining a single speed setting during uphill and downhill road grades, however, consumes more fuel than if the vehicle speed is allowed to vary in order to take advantage of road grade variations to optimize fuel consumption. If upcoming changes in road grade are known in advance (such as from GPS-based maps and advance routing), then temporary offsets can be introduced in the speed setting that accordingly improve energy consumption. However, GPS navigation devices and the necessary in-vehicle map data, computational, and/or remote data communications requirements to determine such offsets in real-time on-board a vehicle represent a significant cost or may be unavailable in some areas. Therefore, it would be desirable to lessen such requirements for determining appropriate speed offsets.

The paper Kolmanovsky et al., *Terrain and Traffic Optimized Vehicle Speed Control*, 6TH IFAC SYMPOSIUM ADVANCES IN AUTOMOTIVE CONTROL, MUNICH, JULY 2010, which is incorporated herein by reference, describes the derivation of a control policy for use by a vehicle in a specific geographic region for best on-average performance without advance knowledge of a route to be traveled or the actual upcoming road grade being approached. The control policy prescribes a vehicle speed setpoint to achieve optimal tradeoff between expected average fuel economy and expected average travel speed. Terrain and traffic properties (i.e., driving conditions) are aggregated as transition probabilities of a Markov chain model in its transition probability matrix (TPM). Stochastic dynamic programming generates the control policy off-line (i.e., off-board the vehicle during the design phase of the vehicle using independent characterization of the terrain), which is then loaded into the vehicle for use when it is driven in the corresponding region.

The paper McDonough et al., *Modeling of Vehicle Driving Conditions Using Transition Probability Models*, 2011 IEEE MULTI-CONFERENCE ON CONTROL APPLICATIONS, DENVER, SEPTEMBER 2011, which is incorporated herein by reference, discloses the use of Kullback-Leibeler (KL) divergence between transition probability matrices of Markov chain models to differentiate between similar or dissimilar driving conditions. Based on a TPM corresponding to a vehicle's current driving conditions, KL divergence could be used to interpolate control policies developed for a discrete set of typical driving cycles for adaptation of vehicle powertrain operation to the terrain and traffic conditions.

The previously proposed systems depend heavily upon a priori data collection (to characterize various regions and driving conditions) and analysis (to create the control policies to be pre-loaded into target vehicles). A more practical approach is needed for deploying optimizations across a large and diverse fleet of vehicle models being driven over a diverse set of regions and driving conditions. A vehicle system and method for the on-board, real-time creation and use of TPMs and associated control policies is disclosed in co-pending U.S. application Ser. No. 13/777,049, entitled "On-Board Real-Time Speed Control Setpoint Variation Using Stochastic Optimization," filed concurrently herewith, which is incorporated herein by reference.

The derivation of a TPM that accurately reflects the transition probabilities in a particular region depends on the processing of a large volume of data. To implement such a process on-board a vehicle, efficiency in the use of storage space and a dependence on only computationally simple steps is highly desirable. Furthermore, it would be desirable to provide for reliable detection of the movement of the vehicle between regions that require different TPMs for an accurate characterization.

SUMMARY OF THE INVENTION

The invention provides an agent for automatic on-board characterization of road/terrain characteristics (e.g., road grade or traffic speed) without using electronic databases of topographic or other regionally-based information (e.g., GPS maps, Electronic Horizon, or GIS). The main functions of the agent include determining the properties of the terrain along the segment of the road that the vehicle is traveling, and aggregating the terrain properties in a set of models covering the terrain characteristics of the areas that were traveled by the vehicle. The agent determines when sufficient data has been collected for representing a region or when the continuing collection process shows that a different region has been entered.

In one aspect of the invention, a method is provided for modeling road grade over a region in which a vehicle is driven. During the time that the vehicle is operated on roadways having a grade that varies over a plurality of predetermined grade ranges, a succession of grade values are generated while operating the vehicle at a predetermined rate. Each grade value identifies a respective grade range then being encountered by the vehicle. A Markov chain road-grade model is updated in response to the succession of grade values, wherein the model represents respective elements of probability in a matrix of transition events from each predetermined grade range to a respective next-in-succession grade range. Each element of the matrix has a value $\pi_{i,j}$ representing a weighted frequency of transition events from a first respective grade value to a second respective grade value divided by a weighted frequency of transition events initiating from the first respective grade value, so that the matrix successively approximates the road grade of the region.

DETAILED DESCRIPTION OF PREFERRED EMBODIMENTS

For convenience, the invention is described in detail for characterizing a road grade within a region. However, any other road characteristic for which transitions from one value to another occur according to representative probabilities can be modeled (and used for optimizing vehicle performance) with the present invention. Such other road characteristics include vehicle speed profiles and traffic speed.

The on-board agent for characterizing the road grade can be represented by a probabilistic occupancy grid (i.e., map) over the expected full range of possible road grades. The occupancy map is a Markov model with states corresponding to individual road grade ranges or intervals defined by imposing a grid over the full range of grade. Since the road grade is spatially distributed, the Markov model is developed to represent the road grade transitions for a specified distance segment of the road (e.g., averaged 30 meters). For example, the grid defining the probabilistic Markov model of the full range of percentage road grade can be chosen as [−6, −5, −4, −3, −2, −1, 0, 1, 2, 3, 4, 5, 6]. The model defines the probability of changing from one value of the grade to another in the next road segment (e.g., the next segment of 30 m). For example, if the full expected grade range [−6%, 6%] is discretized into 3 intervals of 4% each, the transition probability matrix of the Markov model defines the probabilities that in the next 30 m segment the grade will change between pairs of intervals [−6% through −2%], [−2% through 2%], and [2% through 6%]. In practice, partitioning into three ranges may be too coarse. A greater number of intervals such as 6 may preferably be used, or a fuzzy partitioning could alternatively be used.

Figures 1, 2:
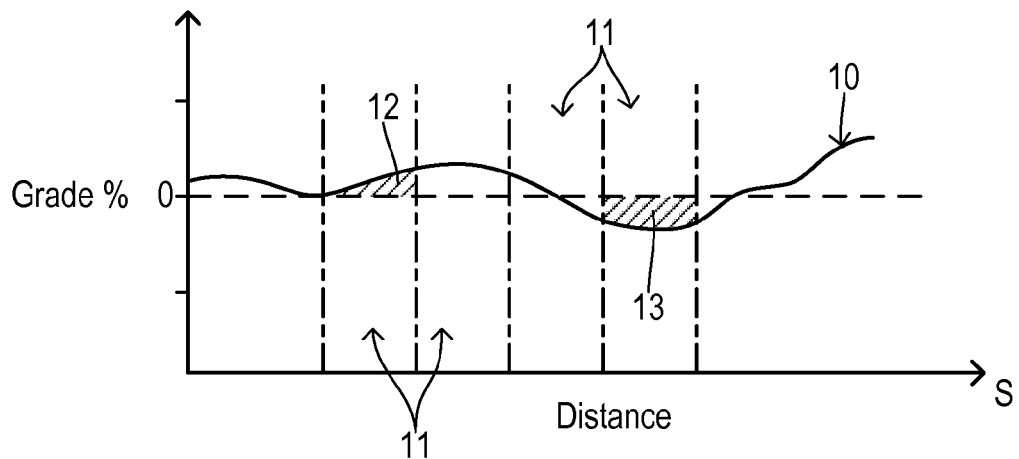
FIG. 1 is a graph showing a varying road grade which is converted into successive range values.
FIG. 2 is a matrix representation of transition probabilities between successive range values.

Referring now to FIG. 1, a curve 10 represents changing road grade as a vehicle travels a distance S over the roadways within a particular geographic region. The grade (measured as a percent slope) changes instantaneously along the road, but the effect of changing road grade on vehicle performance (e.g., fuel economy) can be evaluated using an average grade measured for successive distance intervals 11 (e.g., 30 meters). While operating the vehicle, grade can be estimated using conventional techniques based on engine torque, wheel speed, and other sense variables or can be measured using inclination sensors, for example. The average or composite grade covering respective intervals can be determined by forming the integrals of areas 12 and 13, for example.

A sample matrix is shown in FIG. 2 wherein road grade is divided into six grade ranges $x_1$ through $x_6$. Each grade range may be labeled according to the center or average grade $\bar{x}$ within the range. Each row corresponds to a current value of road grade (having an index i), and each column corresponds to a next-in-succession range (having an index j). Each element of the matrix has a corresponding probability $\pi$ which estimates the probability of a transition event from a first grade range $x_i$ to a next grade range $x_j$.

Figure 3:
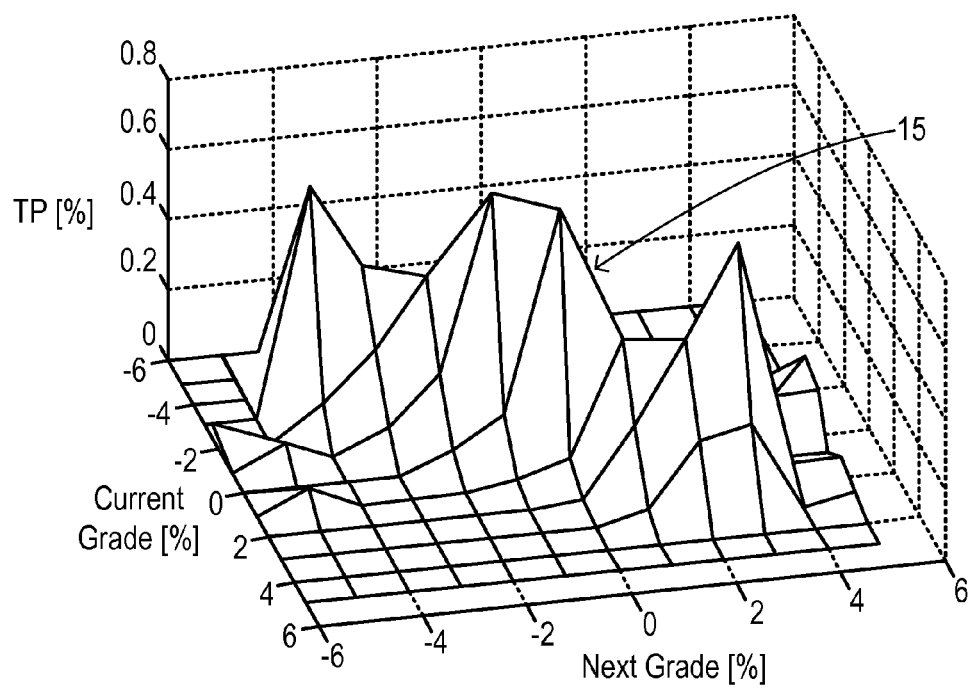
FIG. 3 is a three-dimensional graph depicting a transition probability model for road grade corresponding to a particular geographic region.

FIG. 3 show the transition probability model as a three dimensional surface 15 wherein the surface height represents the magnitude of the transition probability for each pair of current grade to next grade values. In order to derive a reasonable estimate of the transition probabilities, a sufficiently large data sampling across the modeled region is required.

Figure 4:
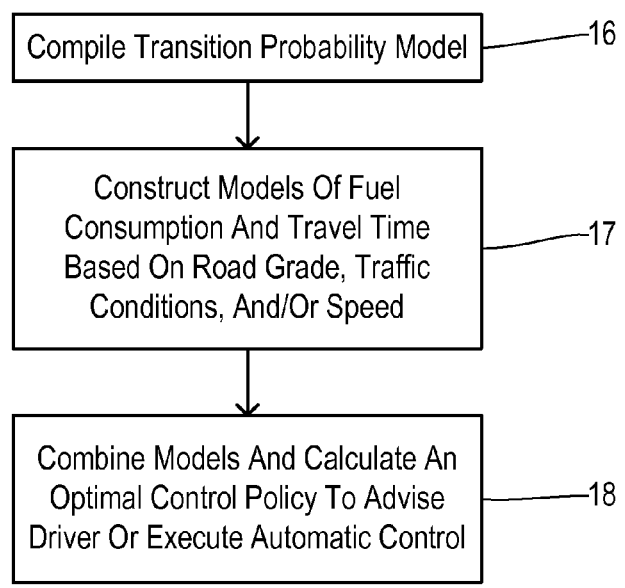
FIG. 4 is a flowchart showing a method of optimizing vehicle powertrain control using transition probability models.

Based on the foregoing transition probabilities, vehicle performance may be optimized as shown in FIG. 4 (and as described in co-pending application Ser. No. 13/777,049). The overall method generates an optimized speed profile which improves fuel efficiency. The preferred approach is known as a stochastic optimal control that applies stochastic dynamic programming (SDP) to models of fuel consumption, travel time and distance, and the various grade and traffic conditions that affect efficiency, time, and distance. In a step 16, a transition probability model is made for characterizing predictable patterns of relevant road characteristics (e.g., traffic speed and road grade) for a particular region. Models of fuel consumption (e.g., for a particular make of vehicle) and travel time to reach a destination are constructed in step 17 which depend on road grade, traffic conditions, and/or speed. Using stochastic dynamic programming (SDP), the models are combined in step 18 so that an optimal control policy is calculated which can control the speed setpoint in order to obtain a best average performance of fuel efficiency and/or travel time. Based on the control policy, a vehicle control system can either advise the driver of recommended speed changes or execute automatic control of the speed setpoint of the cruise control system.

A benefit of this approach is that it does not assume advanced knowledge of the route to be travelled, only that the vehicle is being driven in a specific geographic region in which the modeled road characteristics are consistent. The objective is to determine a control policy which, on one hand, is responsive only to current operating conditions (as is the case for the conventional powertrain control strategy), but on the other hand, provides best on-average performance when travelling frequently in this region. In other words, a vehicle speed setpoint is desired which achieves an optimal trade-off between expected average fuel economy and expected average travel speed. In this approach as described in the Kolmanovsky and McDonough papers cited above, the region's terrain and traffic properties are characterized in the transition probabilities of a Markov chain.

For chains with the Markov property, the next state of the process only depends on the current state of the process. The next state can be predicted using just the probability distribution of the current state and conditional probabilities of the transition between the current state and all possible next states. In the prior art, data has been collected in an advance design phase until a sufficient number of transitions between states are obtained which produces a realistic model for the region (see., e.g., the above technical papers and the technical paper Filev et al., "A Generalized Markov Chain Modeling Approach for On Board Applications," *The* 2010 *International Joint Conference on Neural Networks* (*IJCNN*), pp. 1-8, July 2010). What is needed is a system capable of real-time, on-board construction of TPM matrices which are gradually learned while an individual vehicle is driven.

In a finite-state Markov chain model utilized in the invention, the transition probabilities $\pi_{ij}$ are estimated from the total frequencies of transitions. For a plurality of measurements k, $$\pi_{ij} \approx \frac{N_{ij}(k)}{N_{oi}(k)} = \frac{N_{ij}(k)/k}{N_{oi}(k)/k} = \frac{F_{ij}(k)}{F_{oi}(k)}, \quad (A1)$$

where $F_{ij}(k)$ is the mean frequency of transition events $f_{ij}(k)$ from state $\bar{x}_i$ to state $\bar{x}_j$ and $F_{0i}(k)$ is the mean frequency of the transition events $f_i(k)$ that are initiated from the state i. The mean frequencies can be determined by:

$$F_{ij}(k) = \frac{N_{ij}(k)}{k} = \frac{1}{k}\sum_{t=1}^{k} f_{ij}(t), \text{ and} \quad (A2)$$

$$F_{oi}(k) = \frac{N_{oi}(k)}{k} = \frac{1}{k}\sum_{t=1}^{k} f_i(t)$$

For individual events, $f_{ij}(k)=1$ if a transition from $\bar{x}_i$ to $\bar{x}_j$ occurs at sample time k; $f_i(k)=1$ if a transition is initiated in the state $\bar{x}_i$ at sample time k; and otherwise these take zero values.

The frequencies (A2) can be described recursively for their on-line calculation:

$$F_{ij}(k)=F_{ij}(k-1)+\phi(f_{ij}(k)-F_{ij}(k-1)) \quad (A3)$$

$$F_{oi}(k)=F_{oi}(k-1)+\phi(f_i(k)-F_{oi}(k-1)) \quad (A4)$$

where $\phi$ is a decay factor. In one embodiment, $$\varphi = \frac{1}{k}.$$

However, it may be more preferable to weigh the old data with exponentially decreasing weights by using a constant value for $\phi$ (i.e., a learning rate) instead of the decaying factor, $$\frac{1}{k}.$$

For a constant value of $\phi$, the recursive expressions (A3) and (A4) can be interpreted as AR models implementing an exponential smoothing algorithm (low pass filter) with forgetting factor $\phi$.

By substituting expressions (A3) and (A4) into (A1) we obtain a recursive form of the transition probabilities estimates that are convenient for their on-line learning:

$$\pi_{ij} = \frac{F_{ij}(k)}{F_{oi}(k)} = \frac{F_{ij}(k-1) + \varphi(f_{ij}(k) - F_{ij}(k-1))}{F_{oi}(k-1) + \varphi(f_i(k) - F_{oi}(k-1))}. \quad (A5)$$

Expression (A5) can be rewritten in a matrix form by replacing $f_{ij}(k)$ and $f_i(k)$ by their vector multiplication counterparts, $\tau(k)\gamma(k)^T$ and $\tau(k)\gamma(k)^T$ e, where $\tau(k)$ and $\gamma(k)$ are M-dimensional vectors with ones as the ith and jth elements, respectively, and zeros elsewhere, and e is an M-dimensional vector with all elements equal to one. More specifically, for the probability matrix P formed after a sample time k, $$P(k)=\text{diag}(F_0(k))^{-1}F(k), \quad (A6)$$

where $$F(k)=F(k-1)+\phi(\tau(k)\gamma(k)^T-F(k-1)), \quad (A7)$$

$$F_o(k)=F_o(k-1)+\phi(\tau(k)\gamma(k)^T e-F_o(k-1)). \quad (A8)$$

Figure 5:
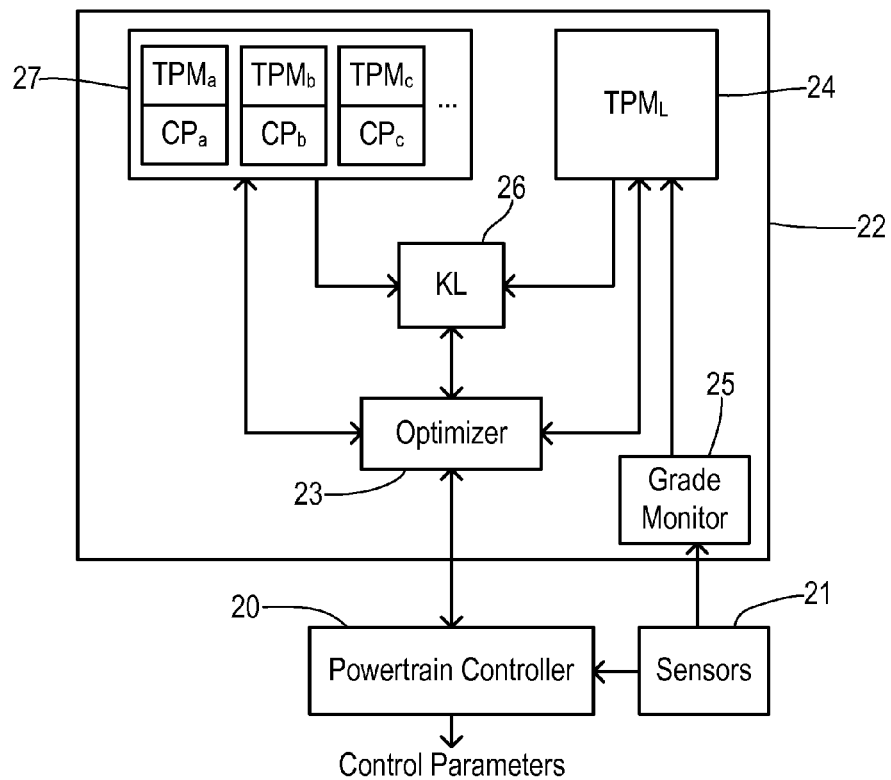
FIG. 5 is a block diagram showing one preferred embodiment of the present invention.

A vehicle system utilizing an on-line process for forming a Markov chain model is shown in FIG. 5. A host vehicle includes a powertrain controller 20 coupled to various sensors 21 for outputting various control parameters to control various components in a vehicle powertrain (e.g., the throttle of a combustion engine). An optimizer system 22 includes an optimizer controller 23 for maintaining a learned or observed transition probability model 24, designated $TPM_L$. Preferably, $TPM_L$ is represented as matrix data resulting from vector manipulation as described above. A grade monitor 25 is coupled to sensors 21 for analyzing the sensor signals to produce a succession of grade values at a predetermined rate (e.g., once per each 30 meters of distance traveled). Each grade value identifies a respective grade range which has been previously identified as required for developing the related optimization models.

As matrix $TPM_L$ 24 is iteratively built up, it provides successive approximations of the regional road grade which becomes increasingly accurate. After sufficient samples have been obtained in the region, additional samples do not significantly change the probability values in the elements in the matrix. Under those conditions, the matrix is said to have converged.

Convergence of the currently observed (i.e., learned) matrix can be periodically checked using the Kullback-Leibeler (KL) divergence which is calculated in a KL block 26. The KL process measures the similarity between two Markov Models transition probability matrices P and Q:

$$D_{KL}(P\|Q) = \sum \sum [P(x^+ \mid x)P^*(x)]\log\left(\frac{P(x^+ \mid x)}{Q(x^+ \mid x)}\right)$$

The model (A6) will be considered an adequate representation of the road characteristic for the region if the temporal difference between two recent KL divergence evaluations of the model tends to zero such that, $$D_{KL}|(P(k)\|P(k-d)|<\epsilon$$

where d represents the number of accumulated samples between the times for checking the stability (i.e., convergence) of the estimated transition probabilities.

When block 26 finds that the KL divergence is below the threshold E, then the converged matrix can be used to check whether the road characteristics in the current region match the road characteristics for which an optimized control policy has already been calculated and made available within a library 27. Within library 27, a plurality of predetermined pre-learned reference matrices $TPM_a, \ldots, TPM_n$ are stored in association with respective control policies $CP_a, \ldots CP_n$. Optimizer controller 23 compares learned (converged) matrix $TPM_L$ one-by-one with the library reference matrices to determine whether a matching driving condition or region can be found. If found, then the corresponding Control Policy (CP) is obtained from library 27 and sent to powertrain controller 20 for execution.

Figure 6:
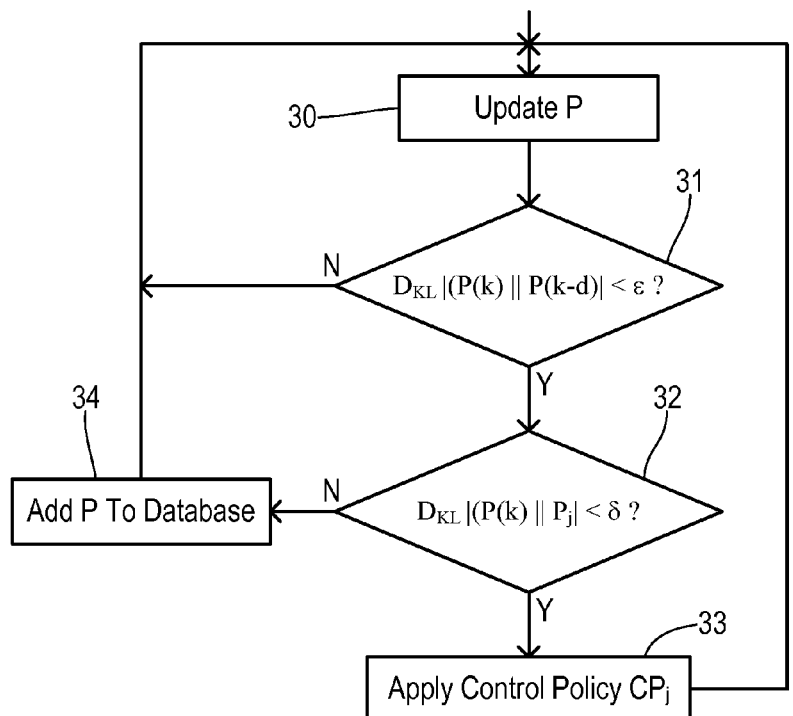
FIG. 6 is a flowchart of one preferred method of the invention.

A preferred method of the invention is shown in FIG. 6. The currently observed matrix $TPM_L$ (shown as P in FIG. 6) is updated in step 30 using the successive grade values determined while driving the vehicle over the roadways in a predetermined region. As more data accumulates in matrix P, its self-convergence is checked in step 31. More specifically, the KL divergence of the current version of P and a prior version of P is compared to a threshold $\epsilon$. More specifically, if the divergence $D_{KL}$, is not less than $\epsilon$ then a return is made to step 30 to continue updating matrix P. If the divergence is less than ε, then the method proceeds to step 32 wherein converged matrix P is compared with reference matrices in the reference library in an attempt to find matching roadway conditions. More specifically, converged matrix P is compared one-by-one with each reference matrix $P_j$ and if the divergence of any individual comparison is less than a threshold δ, then a corresponding control policy $CP_j$ is applied in step 33, and a return is made for continuous updating of matrix P in step 30.

If all the divergences resulting from comparison of matrix P with reference matrices $P_j$ are greater than δ, then converged matrix P is added to the reference library in step 34, and a return is made to step 30 or further updating of learned matrix P. If appropriate resources are present on the vehicle, the added reference matrix can be used in stochastic dynamic programming to create a new corresponding control policy, which can then be provided to the powertrain controller for use while driving in the current region. If such resources are not available on the vehicle, then the reference matrix can be uploaded to other remote resources either wirelessly from the vehicle or during a subsequent hardwired connection of the vehicle at a dealership or service facility and the resulting control policy can be relayed back to the vehicle for storage in the library.

After a control policy is identified and loaded into the powertrain controller, the method in FIG. 6 continues to update the learned probability matrix. In the event that the vehicle moves to a different region characterized by different road characteristics or road grade, matrix P will begin to diverge from its previously converged state. Thus, the self-convergence of matrix P may eventually be greater than threshold ε in step 31. The loss of convergence means that a different control policy should be identified. When this onset of divergence is detected, it may be desirable to reinitialize matrix P to a different state (e.g., with each matrix element being reset to a value 1/L, where L is the total number of matrix elements) in order to potentially reduce the time required for converging to the new state.

What is claimed is:

1. A method of modeling a road characteristic over a region in which a host vehicle is driven, comprising the steps of:
    operating the host vehicle on roadways having a characteristic that varies over a plurality of predetermined ranges;
    generating a succession of characteristic values while operating the host vehicle at a predetermined rate, wherein each characteristic value identifies a respective predetermined range then being encountered by the vehicle;
    updating a Markov chain road-characteristic model stored in an optimizer controller in response to the succession of characteristic values, wherein the model represents respective elements of probability in a matrix of transition events from each predetermined range to a respective next-in-succession range, wherein the optimizer controller stores a current state and a previous state of the matrix;
    periodically testing a convergence of the current state of the matrix with the previous state of the matrix using KL divergence;
    if convergence is found then using the current state of the matrix to identify a powertrain control policy optimized for the characterized road characteristic; and
    adjusting operation of a powertrain of the host vehicle using the identified control policy within a powertrain controller in the host vehicle;
    wherein each element of the matrix has a value $\pi_{i,j}$ representing a weighted frequency of transition events from a first respective characteristic value to a second respective characteristic value divided by a weighted frequency of transition events initiating from the first respective characteristic value, so that the matrix successively approximates the road characteristic of the region.

2. The method of claim 1 wherein the powertrain control policy is identified by the steps of:
    comparing the converged matrix with a plurality of pre-learned reference matrices to search for a matching reference matrix; and
    choosing a powertrain control policy corresponding to the matching reference matrix, wherein the chosen powertrain control policy has been optimized according to the road characteristic characterized by the matching reference matrix.

3. The method of claim 2 wherein if no matching reference matrix is found then:
    storing the converged matrix as a new reference matrix by appending with the pre-learned reference matrices;
    determining a new control policy optimized to the road characteristic which is characterized by the new reference matrix; and
    adjusting operation of the powertrain of the host vehicle using the new control policy.

4. The method of claim 1 wherein each element of the transition probability matrix is estimated using a relationship:

$$\pi_{ij} = \frac{F_{ij}(k)}{F_{oi}(k)} = \frac{F_{ij}(k-1) + \varphi(f_{ij}(k) - F_{ij}(k-1))}{F_{oi}(k-1) + \varphi(f_i(k) - F_{oi}(k-1))}$$

where k is a sample index, i and j are states of the initial and successive characteristic ranges for each respective possible type of transition event in the matrix, $f_{i,j}(k)$ equals 1 if a transition event occurs from state i to state j for sample k and equals zero if no transition event occurs from state i to state j for sample k, $f_i$ equals 1 if a transition event initiates from state i and equals zero if no transition event initiates from state i, $F_{i,j}$ is the mean frequency of transition events $f_{i,j}(k)$ over k samples, $F_{o,i}$ is the mean frequency of transitions events $f_i$ initiating from state i, and φ is a decay factor.

5. The method of claim 4 wherein the matrix is recursively updated as a probability distribution:

$$P(k) = \text{diag}(F_0(k))^{-1} F(k)$$

and wherein $f_{i,j}(k)$ is replaced by its vector-counterpart $\tau(k)\gamma(k)^T$ and $f_i(k)$ is replaced by its vector-counterpart $\tau(k)\gamma(k)^T e$.

6. The method of claim 4 wherein φ is a constant value forgetting factor such that 0<φ≤1.

7. The method of claim 4 wherein φ has a value determined in response to 1/k for at least some of the updating.

8. The method of claim 1 further comprising the steps of:
    continuing to periodically test convergence of updated states of the matrix with previous states of the matrix; and
    if convergence is not found then discontinuing use of the identified powertrain control policy and waiting until convergence is again found in order to identify a respective powertrain control policy.

9. The method of claim 1 wherein the road characteristic is a road grade, and wherein the predetermined ranges are ranges of road grade.

10. Apparatus for a host vehicle that is driven in a region over roadways exhibiting a road characteristic that varies over a plurality of predetermined ranges, comprising:
  a powertrain controller for adjusting control parameters of powertrain components of the host vehicle;
  a road monitor generating a succession of characteristic values while operating the host vehicle at a predetermined rate, wherein each characteristic value identifies a respective range then being encountered by the host vehicle; and
  an optimizer including a Markov chain road-characteristic model that is updated in response to the succession of characteristic values, wherein the model represents respective elements of probability in a matrix of transition events from each predetermined range to a respective next-in-succession range, wherein the optimizer stores a current state and a previous state of the matrix, and wherein each element of the matrix has a value $\pi_{i,j}$ representing a weighted frequency of transition events from a first respective characteristic value to a second respective characteristic value divided by a weighted frequency of transition events initiating from the first respective characteristic value, so that the matrix successively approximates the road characteristic of the region;
  wherein the optimizer periodically tests a convergence of the current state of the matrix with the previous state of the matrix, wherein if convergence is found then the optimizer uses the matrix to identify a powertrain control policy optimized for the characterized road characteristic, and wherein the powertrain controller adjusts the control parameters using the identified control policy.

11. The apparatus of claim 10 further comprising: a library of learned reference matrices and corresponding control policies;
  wherein the optimizer compares the converged matrix with the reference matrices to search for a matching reference matrix and chooses a control policy corresponding to the matching reference matrix, wherein the chosen control policy has been optimized according to the road characteristic that is characterized by the matching reference matrix.

12. The apparatus of claim 11 wherein if no matching reference matrix is found then the optimizer stores the converged matrix in the library as a new reference matrix, determines a new control policy optimized to the road characteristic which is characterized by the new reference matrix, and adjusts the control parameters using the new control policy.

13. The apparatus of claim 10 wherein each element of probability satisfies a relationship:

$$\pi_{ij} = \frac{F_{ij}(k)}{F_{oi}(k)} = \frac{F_{ij}(k-1) + \varphi(f_{ij}(k) - F_{ij}(k-1))}{F_{oi}(k-1) + \varphi(f_i(k) - F_{oi}(k-1))}$$

where k is a sample index, i and j are states of the initial and successive ranges for each respective possible type of transition event in the matrix, $f_{i,j}(k)$ equals 1 if a transition event occurs from state i to state j for sample k and equals zero if no transition event occurs from state i to state j for sample k, $f_i$ equals 1 if a transition event initiates from state i and equals zero if no transition event initiates from state i, $F_{i,j}$ is the mean frequency of transition events $f_{i,j}(k)$ over k samples, $F_{o,i}$ is the mean frequency of transitions events $f_i$ initiating from state i, and $\phi$ is a decay factor.

14. The apparatus of claim 13 wherein the matrix is recursively updated as a probability distribution:

$$P(k) = \text{diag}(F_0(k))^{-1} F(k)$$

and wherein $f_{i,j}(k)$ is replaced by $\tau(k)\gamma(k)^T$ and $f_i(k)$ is replaced by $\tau(k)\gamma(k)^T e$.

15. The apparatus of claim 13 wherein $\phi$ is a constant value such that $0 < \phi \le 1$.

16. The apparatus of claim 13 wherein $\phi$ has a value determined in response to 1/k for at least some of the updating.

17. The apparatus of claim 10 wherein the optimizer continues to periodically test convergence of updated states of the matrix with previous states of the matrix, and if convergence is not found then discontinuing use of the identified powertrain control policy and waiting until convergence is again found in order to identify a respective powertrain control policy.

18. The apparatus of claim 10 wherein the road characteristic is a road grade, and wherein the predetermined ranges are ranges of road grade.

* * * * *